W. A. SYLVESTER.
MACHINE FOR SHEARING SHEET METAL BLANKS.
APPLICATION FILED OCT. 30, 1909. RENEWED SEPT. 30, 1910.
976,757.  Patented Nov. 22, 1910.
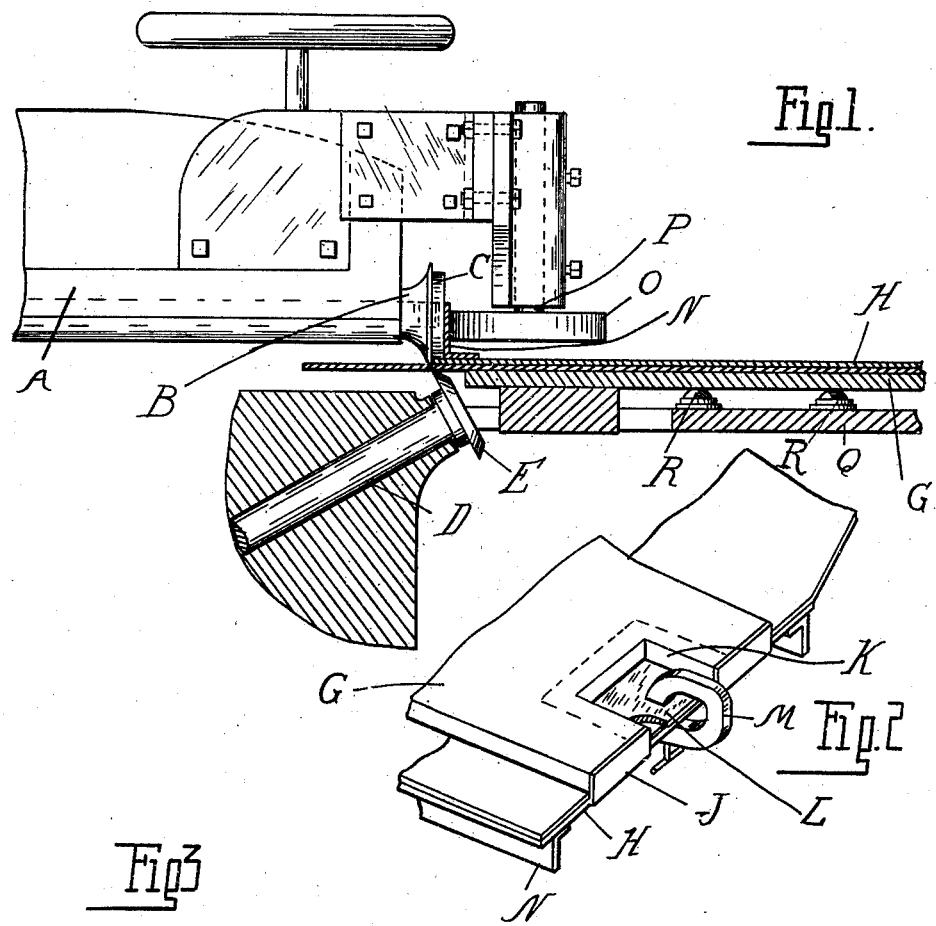
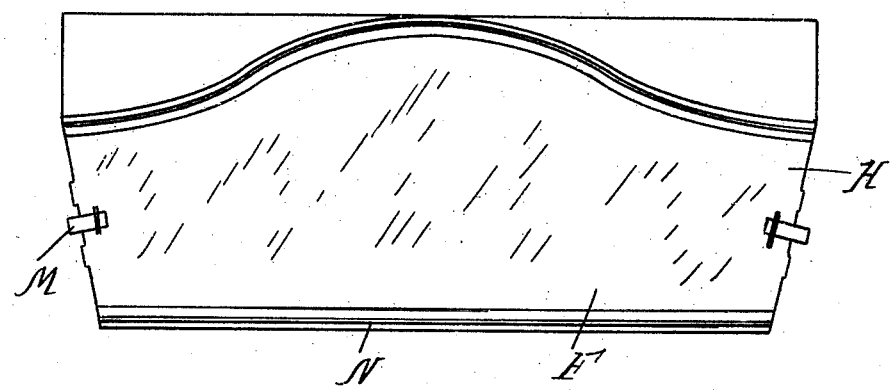
Witnesses  Inventor
Wilber A. Sylvester
By ............ Attorneys

UNITED STATES PATENT OFFICE.

WILBER A. SYLVESTER, OF DETROIT, MICHIGAN, ASSIGNOR TO CHARLES R. WILSON, OF DETROIT, MICHIGAN.

MACHINE FOR SHEARING SHEET-METAL BLANKS.

976,757. Specification of Letters Patent. Patented Nov. 22, 1910.

Application filed October 30, 1909, Serial No. 525,548. Renewed September 30, 1910. Serial No. 584,767.

*To all whom it may concern:*

Be it known that I, WILBER A. SYLVESTER, a citizen of the United States of America, residing at Detroit, in the county of Wayne and State of Michigan, have invented certain new and useful Improvements in Machines for Shearing Sheet-Metal Blanks, of which the following is a specification, reference being had therein to the accompanying drawings.

The invention relates to machines for shearing sheet metal, and it is the object of the invention to provide means for accurately guiding the work in relation to the shearing cutter in conformity with the pattern desired.

It is a further object to obtain a construction which is adapted for following a curved or irregular pattern.

With these objects in view, the invention consists in the construction as hereinafter set forth.

In the drawings—Figure 1 is a sectional elevation of the machine illustrating the operation thereof; Fig. 2 is a perspective view of the workholder showing the clamping means therefor; and Fig. 3 is a plan view of the workholder and the work.

My invention is applicable to various uses in the cutting of sheet metal blanks, but, in the construction shown, is more particularly designed for use in cutting blanks of metallic vehicle bodies. For this purpose, it is necessary to shear along curved lines, which is a difficult operation to perform with any ordinary shearing instrument. With my improved machine, the operation is performed readily and expeditiously—first, by reason of the peculiar construction of the workholder and guiding means, and—second, by the peculiar construction and arrangement of the shearing cutters.

In detail, A is the frame of the machine, in which is journaled a shaft or arbor B, carrying a rotary shearing cutter C, and D is a second arbor arranged at an angle to the axis of the shaft B in the vertical plane thereof. This arbor has mounted thereon the shearing cutter E, the plane of rotation of which is oblique and at an angle to the rotation of the cutter C. The arrangement is such that the cutters C and E are in shearing relation to each other, and, by reason of their angular relation, the shearing edges contact at one point only. This permits of turning the work to follow any curve, which could not be performed with a straight shearing edge.

For holding and guiding the work, an uncut blank is first placed in a holder F, comprising a lower plate G and an upper plate H. These plates are engaged with the work, preferably by providing the upper plate with depending flanges J at opposite ends thereof, which embrace the blank and the lower plate G. The lower plate G, which is of greater thickness than the upper plate, is cut away at K, and is provided with a thin plate L extending across the cut-away portion. Clamps M are then arranged to engage the plates L and H, as indicated in Fig. 2, the cut-away portion K providing clearance for the lower leg of the clamp.

The guide and pattern are secured to the upper plate H, and preferably consists of an angle bar N suitably fashioned.

O is an anti-friction roll journaled at P upon the frame and forming an abutment against which the guide flange N is held.

With the construction as described, the workholder with the work therein is placed upon a work-supporting table Q, preferably provided with roller bearings R, and the operator then moves the holder about with the guide flange N in contact with the anti-friction roll O. In so doing, the projecting sheet metal of the blank is caused to pass between the shearing cutters C and E, which produces a cut in exact conformity with the pattern guide. When the shearing is completed, the blank may be quickly removed and an uncut blank placed in the holder, after which the operation is repeated.

What I claim as my invention is:

1. The combination with a rotary shearing cutter, of a workholder for a sheet metal blank, a guide flange on said holder, and an abutment in fixed relation to said shearing cutter against which said guide flange is held during the advancement of the work.

2. The combination with a rotary shearing cutter, of a workholder for the sheet metal blank, a guide flange on said holder, and an anti-friction roll against which said guide flange is held during the advancement of the work.

3. The combination with a rotary shearing cutter, of a workholder for embracing a sheet metal blank, clamps for securing said holder to said blank, a guide flange on said holder, and an anti-friction roll revoluble in the plane of the movement of said work against which said guide flange is held.

4. The combination with a rotary shearing cutter of a coöperating shearing cutter arranged with its plane of rotation oblique to that of the first-mentioned cutter, and mechanism positioned in proximity to one of said cutters and forming therewith a means for guiding the work in relation to said cutter.

5. The combination with a rotary shearing cutter, a coöperating shearing cutter, having its plane of rotation oblique to the first-mentioned cutter, a holder for the blank to be sheared, a guide flange thereon, and an abutment or rest for said guide flange adjacent to the meeting point of said coöperating shearing cutters.

6. The combination with a pair of rotary shearing cutters, obliquely arranged in relation to each other; of a work-supporting table, a workholder freely movable upon said table, a guide flange secured to said holder, and a roller bearing for said guide flange adjacent to the point of engagement of said shearing cutters.

In testimony whereof I affix my signature in presence of two witnesses.

WILBER A. SYLVESTER.

Witnesses:
NELLIE KINSELLA,
W. J. BELKNAP.